United States Patent
Kang et al.

(10) Patent No.: US 9,042,691 B2
(45) Date of Patent: May 26, 2015

(54) OPTICAL COUPLING MODULE FOR SILICON PHOTONICS CHIP

(71) Applicant: Electronics and Telecommunications Research Institute, Daejeon-si (KR)

(72) Inventors: Sae-Kyoung Kang, Daejeon-si (KR); Sang-Soo Lee, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 9 days.

(21) Appl. No.: 14/081,197

(22) Filed: Nov. 15, 2013

(65) Prior Publication Data

US 2014/0153873 A1 Jun. 5, 2014

(30) Foreign Application Priority Data

Dec. 3, 2012 (KR) .................. 10-2012-0139064

(51) Int. Cl.
*G02B 6/34* (2006.01)
*G02B 6/293* (2006.01)
*G02B 6/122* (2006.01)
*G02B 6/30* (2006.01)
G02B 6/12 (2006.01)

(52) U.S. Cl.
CPC .............. *G02B 6/34* (2013.01); *G02B 6/29334* (2013.01); *G02B 6/1228* (2013.01); *G02B 6/30* (2013.01); *G02B 2006/12107* (2013.01)

(58) Field of Classification Search
CPC .... G02B 6/34; G02B 6/1228; G02B 6/29334; G02B 6/30; G02F 2201/302
USPC .................................................. 385/37, 14, 43
See application file for complete search history.

(56) References Cited

U.S. PATENT DOCUMENTS

| | | | | |
|---|---|---|---|---|
| 5,187,760 | A * | 2/1993 | Huber | 385/37 |
| 6,233,378 | B1 * | 5/2001 | Sun | 385/22 |
| 6,549,708 | B2 * | 4/2003 | Worchesky et al. | 385/37 |
| 2009/0154871 | A1 * | 6/2009 | Pyo et al. | 385/14 |
| 2011/0038588 | A1 * | 2/2011 | Kim et al. | 385/131 |
| 2011/0255824 | A1 * | 10/2011 | Lee et al. | 385/14 |
| 2013/0121639 | A1 * | 5/2013 | Shimizu | 385/37 |

OTHER PUBLICATIONS

Roelkens et al., Efficient silicon-on-insulator fiber coupler fabricated using 248-nm-deep UV lithography, Photonics Technology Letters, IEEE, V. 17, N. 12, pp. 2613-2615.*

(Continued)

*Primary Examiner* — Peter Radkowski
(74) *Attorney, Agent, or Firm* — Rabin & Berdo, P.C.

(57) ABSTRACT

An optical coupling module for a silicon photonics chip in which a grating is formed on an optical waveguide, and a material having an intermediate refractive index between refractive indexes of a core and a cladding for side surface optical coupling of the silicon photonics chip is provided. The optical coupling module which is optically coupled with an internal/external optical fiber comprises a core transmitting light, and a cladding covering the core and holding the light in the core through total internal reflection, wherein a grating is formed at one end of the core, and a refractive element is formed between the one end of the core and the cladding, has an intermediate refractive index between the refractive indexes of the core and the cladding, and is optically coupled with the internal/external optical fiber.

14 Claims, 8 Drawing Sheets

(56) References Cited

OTHER PUBLICATIONS

Attila Mekis et al., "A Grating-Coupler-Enabled CMOS Photonics Platform" IEEE Journal of Selected Topics in Quantum Electronics, pp. 597-608, vol. 17, No. 3, May/Jun. 2011.

Gunther Roelkens et al., "Efficient Silicon-on-Insulator Fiber Coupler Fabricated Using 248-nm-Deep UV Lithography" IEEE Photonics Technology Letters, pp. 2613-2615, vol. 17, No. 12, Dec. 2005.

* cited by examiner

OPTICAL COUPLING MODULE FOR SILICON PHOTONICS CHIP

CROSS-REFERENCE TO RELATED APPLICATION

This application claims the benefit under 35 U.S.C. §119(a) of Korean Patent Application No. 10-2012-0139064, filed on Dec. 3, 2012, the entire disclosure of which is incorporated herein by reference for all purposes.

BACKGROUND

1. Field

The following description relates to an optical coupling module for a silicon photonics chip, and more specifically, to an optical coupling module for a silicon photonics chip in which, for optical coupling at sides or inside of the silicon photonics chip, a grid is formed in an optical waveguide and a material is formed having an intermediate refractive index between a core and a cladding.

2. Description of the Related Art

FIG. 1 is a diagram showing a parallel interface method of a conventional mobile terminal, and FIG. 2 is a diagram showing waveforms for digital communication in the interface method of FIG. 1.

Recently, as a result of cost reduction, speed increase, and storage capacity expansion of optical communication systems, technology implementing a CMOS photonics-based electronic circuit portion and optical circuit portion in one chip is gradually being emphasized. This kind of technology has been continuously studied for ten years, and now businesses that use this kind of manufacturing process to provide foundry services have appeared. A silicon photonics-based optical circuit chip such as an optical multiplexer and a demultiplexer (an arrayed waveguide grating (AWG)), an optical modulator (a PN modulator, a PIN modulator, a ring modulator, an optical receiving element (a photodiode, a Ge photodiode), an optical waveguide, an optical coupler and an isolator (a Y-branch), an optical filter, an optical coupler for optical s coupling with an exterior (a grating coupler, an edge coupler), and so on, are provided as part of a library of chips fabricated by foundry businesses.

An optical circuit implemented using such an optical device is optically coupled with an external element using a grating coupler or a side coupler formed on a silicon photonics chip. The grating coupler has a larger optical alignment tolerance, but it is sensitive to wavelength. On the other hand, the side coupler works independently of wavelength, but it has a very small optical alignment tolerance. The physical size of an optical waveguide implemented on a silicon photonics chip is approximately 0.5 um×0.22 um.

Further, a refractive index of silicon, which is a core material, is about 3.5, and a refractive index of a silicon oxide, which is a cladding material, is about 1.4. Since the is difference in refractive index between the core and the cladding is considerable, and the optical waveguide is very small, external optical coupling to a single mode optical fiber is nearly impossible.

FIG. 1 is a diagram showing a grating optical coupler implemented by Luxtera of the U.S.A.

The grating optical coupler may have a grating 11 formed at one end of an optical waveguide 10, and achieve optical coupling by arranging a core 20 that is to be optically coupled in parallel with an angle (θ) at which light output from the grating 11 is refracted. As described above, the grating optical coupler may have the disadvantage of being sensitive to wavelength, and when manufacturing an optical module, it has the disadvantage of its package becoming large since it is tall.

FIG. 2 is a diagram showing a structure of a side optical coupler disclosed by a European silicon phonics study group at Ghent University. As shown in FIG. 2, the side optical coupler may have a silicon optical waveguide with an inverted taper 31, and a polymer cladding 40 formed on the inverted taper 31 and a silicon core 30, in order to gradually decrease an effective refractive index of the silicon core 30. Further, an optical signal propagates through silicon oxide located at the bottom of the silicon core 30, causing the size of an optical mode output from sides to considerably increase to approximately 3 um×3 um, thereby making it possible to achieve optical coupling with single mode optical fiber. At this time, when the optical signal propagates through the silicon oxide, optical signal loss occurs, and when performing optical coupling at the sides, additional optical signal loss occurs.

SUMMARY

The following description relates to an optical coupling module for a silicon photonics chip in which a grating is formed on a silicon optical waveguide, a refractive element having an intermediate refractive index is additionally arranged between a core and a cladding, and optical coupling efficiency at sides or an interior is increased.

In one general aspect, there is provided an optical coupling module of a silicon photonics chip which is optically coupled with an internal/external optical fiber, the optical coupling module including: a core transmitting light; and a cladding covering the core and holding the light in the core through total internal reflection, wherein a grating is formed at one end of the core, and a refractive element is formed between the one end of the core and the cladding, has an intermediate refractive index between the refractive indexes of the core and the cladding, and is optically coupled with the internal/external optical fiber.

The core may be made of a silicon material, and the cladding may be made of a silicon oxide material, and the refractive element may be made of a silicon-based compound.

A predetermined space may be formed between the refractive element and the core, and the cladding may fill the space between the refractive element and the core.

A grating may be formed on a side surface of the refractive element which is opposite to the core.

The grating formed on the core may be formed to project outward for each section on an upper portion of the core.

The refractive element may be formed on an upper portion of the core, and cover an outer surface of the grating.

A cross-section of the refractive element may be formed to be identical or similar to a cross-section of a core of the internal/external optical fiber.

The refractive element may output an optical signal to the internal/external optical fiber.

The refractive element may receive an optical signal from the internal/external optical fiber.

The refractive element may be optically coupled with the external optical fiber in a butt coupling manner.

The refractive element may be optically coupled with the external optical fiber in a focused lens manner.

The silicon photonics chip may have a multi-layer structure in which an optical device and an optical waveguide having a specific function are disposed on every layer, and the refractive element may be optically coupled with the optical waveguide inside the silicon photonics chip, to transmit and receive an optical signal.

Figure 1:
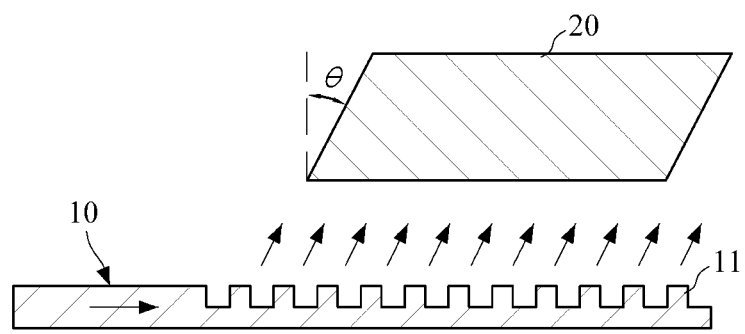
FIG. 1 is a diagram showing a structure of an optical coupler using a conventional grating.
Figure 2:
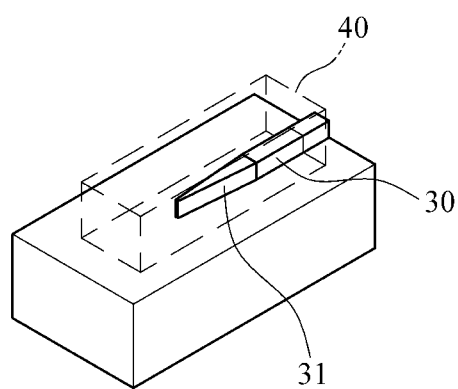
FIG. 2 is a diagram showing a structure of a conventional side optical coupler.

Throughout the drawings and the detailed description, unless otherwise described, the same drawing reference numerals will be understood to refer to the same respective elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Figure 3:
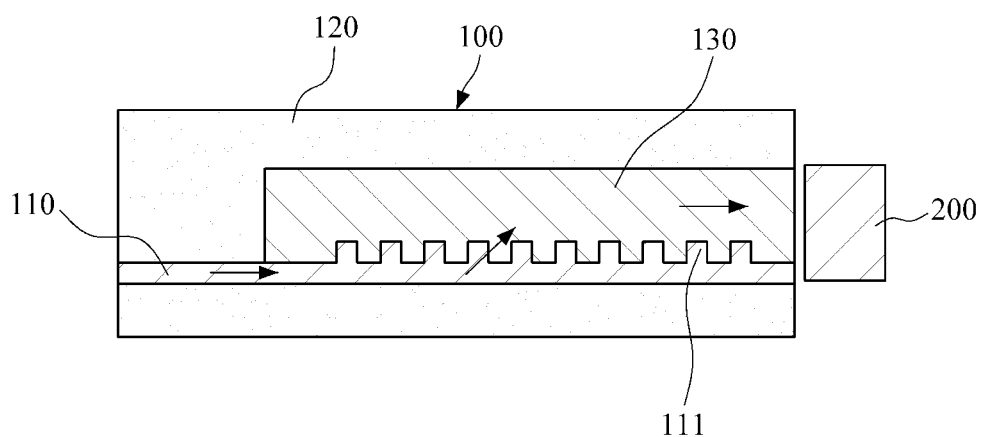
FIG. 3 is a cross-sectional view of an optical coupling module of a silicon photonics chip according to one embodiment of the inventive concept.
Figure 4:
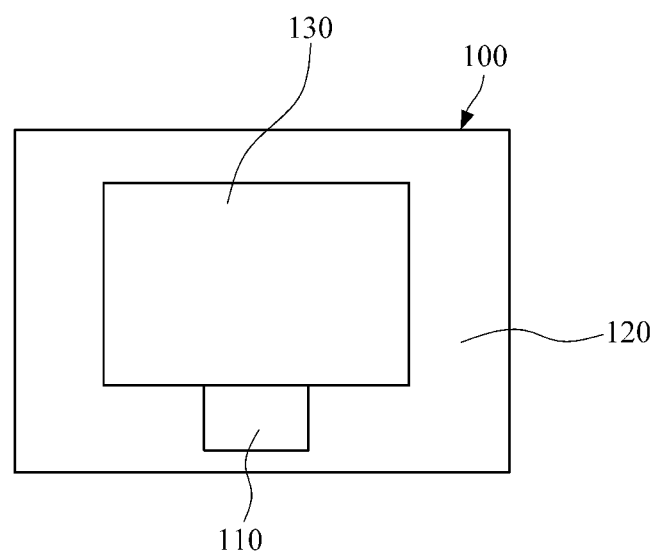
FIG. 4 is a side view of the optical coupling module of a silicon photonics chip shown in FIG. 3.

FIG. 3 is a cross-sectional view of an optical coupling module of a silicon photonics chip according to an exemplary embodiment of the inventive concept. In FIG. 3, arrows indicate a path of light to an exterior. FIG. 4 is a side view of the optical coupling module of a silicon photonics chip shown in FIG. 3.

As shown in FIGS. 3 and 4, an optical coupling module of a silicon photonics chip according to one embodiment of the inventive concept may include a core 110 transmitting light, a cladding 120 covering the core 110 and holding the light within the core 110 by total internal reflection. Further, a grating 111 may be formed at one side end the core 110, and a refractive element 130 having an intermediate refractive index between the refractive indexes of the core and the cladding may be formed between the one side end of the core 110 and the cladding 120 to achieve optical coupling with an internal/external optical fiber. For example, an optical fiber 200 may be a single mode optical fiber.

The silicon photonics chip 100 may include a plurality of integrated optical devices on a silicon substrate, for example, an optical connector (INPUT), a multiplexer (MUX), a demultiplexer (DEMUX), a photodetector (PD), and so on. Further, the silicon photonics chip of the inventive concept may have a multi-layer structure, and each layer may include an optical device, an optical waveguide, and so on, having a specific function. Accordingly, the silicon photonics chip 100 may ensure that the refractive element 130 is optically connected with the external optical fiber 200, and with the optical device and the optical waveguide inside the silicon photonics chip 100, to transmit and receive an optical signal.

The core 110 may transmit light from an optical source, and the cladding 120 may prevent loss of light passing through the core 110. The cladding 120 may be made of a material having a lower refractive index than the core 110, and be formed around the core 110 to cover the core 110. As described above, since the cladding 120 has a lower refractive index than the core 110, when light propagates in the core 110, it is incident on a boundary surface at an angle that is greater than a critical angle, so that total internal reflection occurs. Accordingly, when the light (that is, an optical signal) is incident on the boundary surface between the core 110 and the cladding 120, it fails to escape the core 110, which has a large refractive index, and remains confined within the core 110.

According to one embodiment of the inventive concept, the grating 111 may be formed at one end of the core 110 by etching, and so on, the refractive element 130 having an intermediate is refractive index between the refractive indexes of the core 110 and the cladding 120 may be formed between the end of the core 110 where the grating 111 is formed and the cladding 120, and may be optically coupled with the internal/external optical fiber. The grating 111 may be formed on an upper portion, a lower portion, or side portions. On the other hand, the refractive element 130 may be formed adjacent to the grating 111 which is formed on the core 110, and may be formed to have a predetermined space with the grating 111.

In the case of the grating 111 being formed on the core 110, an angle at which an optical signal passing through the core 110 is refracted may change, causing the signal to leak out in a specific direction. At this time, since the refractive element 130 has a refractive index that is smaller than that of the core 110 and greater than that of the cladding 120, an optical signal may be input, refracted through the grating 111, transmitted to an end portion of the silicon photonics chip 100 through the refractive element 130 without loss to the exterior due to an action of the cladding 120.

The optical signal which is transmitted to the end portion of the silicon photonics chip 100 may be output through an end portion of the refractive element 130, and the output optical signal may be transmitted to a core of the optical fiber 200 which is optically coupled at the sides or the inside of the silicon photonics chip 100. Since a difference in refractive index between the refractive element 130 and the cladding 120 is smaller than between the refractive element 130 and the core 110, the optical signal may be easily optically coupled using a general optical fiber at the end portion of the refractive element 130 or the inside of the silicon photonics chip 100.

According to one embodiment of the inventive concept, the core 110 may be made of a silicon Si material, the cladding may be made of a silicon oxide SiO2 material, and the refractive element 130 may be made of a silicon-based compound. The core 110 may be made of armorphous silicon or polysilicon, and formed by monocrystallizing the armorphous silicon or polysilicon. If the core 110 is made of the silicon Si material, the refractive index of the core 110 may be 3.5. If the cladding 120 is made of the Silicon oxide SiO2 material, the refractive index of the cladding 120 may be 1.44. Alternatively, the refractive element 130 may be made of a silicon-based compound having a refractive index between 3.5 and 1.44. In particular, the refractive element 130 may be made to have a slightly different refractive index than the silicon oxide SiO2.

Figure 5:
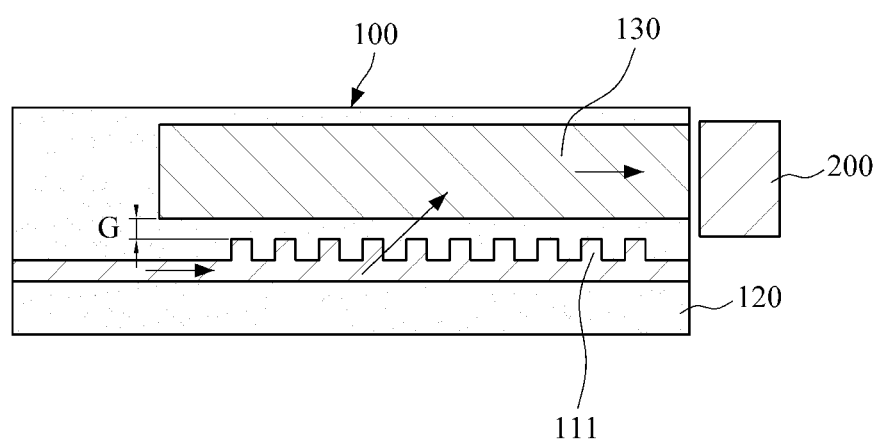
FIG. 5 is a cross-sectional view of an optical coupling module of a silicon photonics chip according to another embodiment of the inventive concept.
Figure 6:
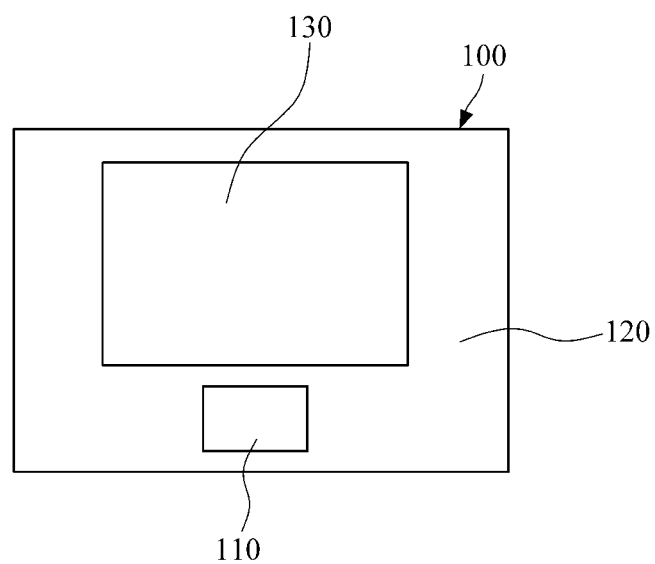
FIG. 6 is a side view of the optical coupling module of a silicon photonics chip shown in FIG. 5.

FIG. 5 is a cross-sectional view of an optical coupling module of a silicon photonics chip according to another embodiment of the inventive concept. In FIG. 5, arrows indicate a path of light to the exterior. FIG. 6 is a side view of the optical coupling module of a silicon photonics chip shown in FIG. 5. Referring to FIGS. 5 and 6, there may be a predetermined space between the refractive element 130 and the core 110, and the space between the refractive element 130 and the core 110 may be filled with a material of the cladding 120. The refractive element 130 may be formed around the refractive element 130 adjacent to the core 110, or, according to an embodiment of the inventive concept, may be formed to be separated by the predetermined space. The space between the refractive element 130 and the core 110 may be filled with the same material as the cladding 120. As described above, in the case that the cladding 120 fills the space between the refractive element 130 and the core 110, after optical coupling is achieved from the grating 111 of the core 110 to the refractive element 130, since the cladding 120 between the refractive element 130 and the core 110 protects against signal loss due to reflection in the direction of the core 110, optical signal transmission may be easily performed.

Figure 8:
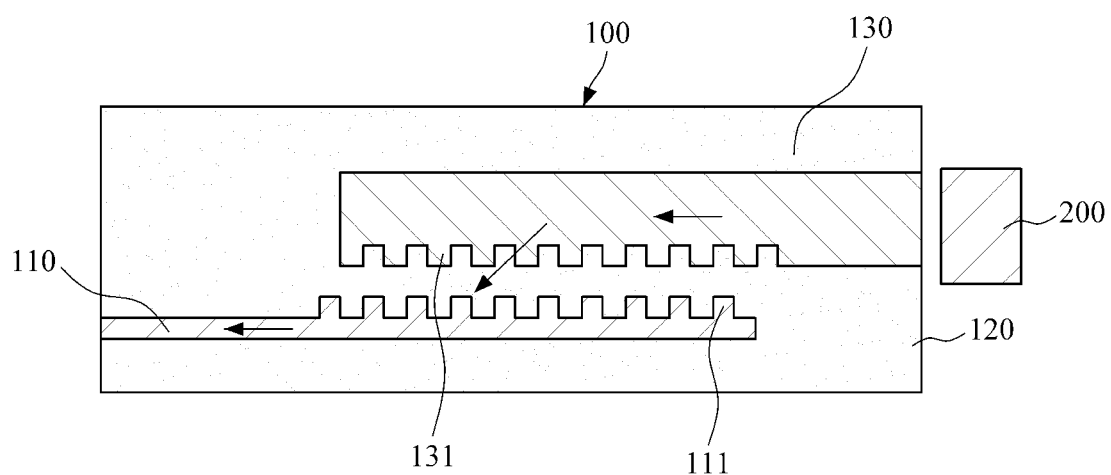
FIG. 8 is a cross-sectional view of an optical coupling module of a silicon photonics chip according to still another embodiment of the inventive concept.

FIG. 8 is a cross-sectional view of an optical coupling module of a silicon photonics chip according to still another embodiment of the inventive concept. In FIG. 8, arrows indicate a path of light entering from outside. Referring to FIG. 8, a grating 131 may be formed on one side surface of the refractive element 130 which is opposite to the core 110. In case the grating 131 on the one side of the refractive element 130 is formed to face the grating 111 of the core 110, the core 110 and the refractive element 130 may be coupled to transmit an optical signal at a specific angle due to an effect of the gratings 111 and 113.

That is, if light is output from the core 110 to the refractive element 130, the light may be input to the refractive element 130 at a specific angle since the light is refracted through the grating 111 of the core 110. At this time, the refractive element 130 may receive the light at the specific angle through the grating 131, change the effective angle of refraction, and transmit the light. On the other hand, the grating 111 of the core 110 and the grating 131 of the refractive element 130 may have the same shape in order to exactly offset the change in angle due to refraction caused by each other.

According to still another embodiment of the inventive concept, the grating 111 formed on the core 110 may be formed to project outward for each section on the upper portion of the core 110. Further, the refractive element 130 may be formed at an upper portion of the core 110 to cover an outer surface of the grating 111. The refractive element 130 may be formed to cover all surfaces constituting an upper portion of the grating 111, only where the grating 111 is formed.

According to still another embodiment of the inventive concept, a cross-section of the refractive element 130 may be formed to be identical or similar to a cross-section of the core. If the cross-section of the refractive element 130 from which light is output and the cross-section of the core of the optical fiber 200 to which the light is input are formed to be identical or similar, optical coupling efficiency may be greater than between the refractive element 130 and the optical fiber 200.

Referring FIG. 3 to FIG. 5, the refractive element 130 according to embodiments of the inventive concept may output an optical signal to the internal/external optical fiber 200. In this case, the silicon photonics chip 100 may include a light output portion that outputs light to the optical fiber 200. In the case of outputting the optical signal through the refractive element 130, the angle at which light is refracted through the core 110 may be changed by the grating 111, and the light may leak out to the refractive element 130. After passing through the refractive element 130, the light may be coupled with the core of the internal/external optical fiber 200.

Figure 7:
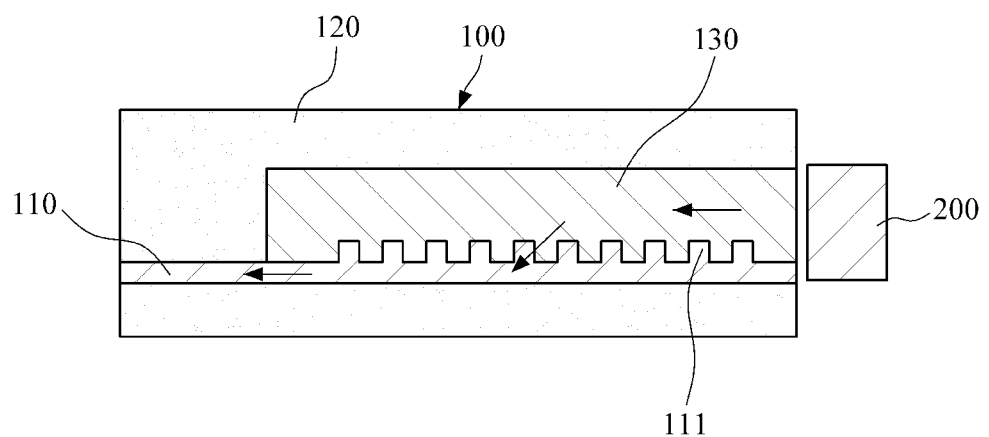
FIG. 7 is a cross-sectional view of an optical coupling module of a silicon photonics chip according to still another embodiment of the inventive concept.

FIG. 7 is a cross-sectional view of an optical coupling module of a silicon photonics chip according to still another embodiment of the inventive concept. In FIG. 7, arrows indicate a path along which light enters. As shown in FIG. 7, the refractive element 130 may receive an optical signal from the internal/external optical fiber 200. At this time, the silicon photonics chip 100 may include a photodetector detecting light from the optical fiber 200. In the case of inputting the optical signal through the refractive element 130, if the light is output through the core of the optical fiber 200, the output light is transmitted to an end portion of the refractive element 130. After that, a refraction angle of light passing through the refractive element 130 may be changed through the grating 111 of the core 110, and the light may be transmitted to the core 110.

According to embodiments of the inventive concept, the refractive element 130 can directly couple with the external optical fiber 200 in a butt coupling manner or a focused lens manner. Since a difference in refractive index between the refractive element 130 and the cladding 120 may not be large, the optical signal output at the side surface of the silicon photonics chip 100 can be directly optically coupled with an external general optical fiber in the butt coupling manner, or can be optically coupled using the focused lens.

According to an optical coupling module of a silicon photonics chip according to embodiments of the inventive concept, the module may have a grating 111 formed on a silicon optical waveguide, and a refractive element 130 having an intermediate refractive index between the refractive indexes of the core 110 and the cladding 120 formed between the core 110 of the silicon material and the cladding 120 of the silicon oxide material, thereby increasing optical alignment tolerance, increasing optical coupling efficiency at a side surface, minimizing a size of the optical coupling module and the silicon photonics chip, improving productivity due to a simple structure, lowering manufacturing costs, and facilitating application in various fields.

The inventive concept can be implemented as computer-readable codes in a computer-readable recording medium. The computer-readable recording medium includes all types of recording media in which computer-readable data are stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed to computer systems over a network, in which computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical coupling module of a silicon photonics chip which is optically coupled with an internal/external optical fiber, the optical coupling module comprising:
   a core transmitting light and having an end grating formed at one end of the core;
   a cladding covering the core and holding the light in the core through total internal reflection; and
   a refractive element formed between the core grating and the cladding, and having an intermediate refractive index between the refractive indexes of the core and the cladding, the refractive element being optically coupled with the internal/external optical fiber, the refractive element having a refractive grating in direct contact with the end grating and in a shape that is the same as that of the end grating so that the refractive grating is disposed within the end grating.

2. The optical coupling module according to claim 1, wherein
   the core is formed of a silicon material,
   the cladding if formed of a silicon oxide material, and
   the refractive element is formed of a silicon-based compound.

3. The optical coupling module according to claim 1, wherein a predetermined space is formed between the refractive element and the core, and the cladding fills the space between the refractive element and the core.

4. The optical coupling module according to claim 3, wherein a grating is formed on a side surface of the refractive element which is opposite to the core.

5. The optical coupling module according to claim 1, wherein the grating has projections that each are formed to project outward on from an upper portion of the core.

6. The optical coupling module according to claim 5, wherein the refractive element covers an outer surface of the end grating, and is formed on an upper portion of the core.

7. The optical coupling module according to claim 1, wherein a cross-section of the refractive element is formed to be identical or similar to a cross-section of a core of the internal/external optical fiber.

8. The optical coupling module according to claim 1, wherein the refractive element outputs an optical signal to the internal/external optical fiber.

9. The optical coupling module according to claim 1, wherein the refractive element receives an optical signal from the internal/external optical fiber.

10. The optical coupling module according to claim 1, wherein the refractive element is optically coupled with the external optical fiber in a butt coupling manner.

11. The optical coupling module according to claim 1, wherein the refractive element is optically coupled with the external optical fiber in a focused lens manner.

12. The optical coupling module according to claim 1, wherein the silicon photonics chip has a multi-layer structure in which every layer includes an optical device and an optical waveguide having a specific function, and the refractive element is optically coupled with one or more of the optical waveguides inside the silicon photonics chip, to transmit and receive an optical signal.

13. The optical coupling module according to claim 1, wherein no cladding is disposed between the end grating and the refractive grating on any straight line that both the end grating and the refractive grating are disposed upon.

14. The optical coupling module according to claim 1, wherein the end grating and the refractive grating each have a plurality of projections and recesses, the plurality of projections of the end grating being disposed within the recesses of the refractive grating, and the plurality of projections of the refractive grating being disposed within the recesses of the end grating.

* * * * *